US012625896B1

(12) United States Patent
Meyer et al.

(10) Patent No.: US 12,625,896 B1
(45) Date of Patent: May 12, 2026

(54) CHATBOT ACCESS TO ERP DATA USING LARGE LANGUAGE MODEL WITH INTERMEDIATE QUERY REPRESENTATION

(71) Applicant: SAP SE, Walldorf (DE)

(72) Inventors: Christoph Meyer, Berlin (DE); Xiang Yu, Berlin (DE); Manuel Zeise, Karlsruhe (DE); Isil Pekel, Limburgerhof (DE); Zahra Zamansani, Neulussheim (DE); Leslie Zanon, Nogent-sur-Marne (FR); Tanguy Lucci, Lyons (FR); Hassan El Hajj, Berlin (DE); Nikolay Grechanov, Speyer (DE); Martin Zuber, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/074,900

(22) Filed: Mar. 10, 2025

(51) Int. Cl.
| | |
|---|---|
| *G06F 16/30* | (2019.01) |
| *G06F 16/332* | (2019.01) |
| *G06F 16/3332* | (2025.01) |
| *G06F 16/338* | (2019.01) |
| *H04L 51/02* | (2022.01) |

(52) U.S. Cl.
CPC .......... *G06F 16/338* (2019.01); *G06F 16/332* (2019.01); *G06F 16/3332* (2019.01); *H04L 51/02* (2013.01)

(58) Field of Classification Search
CPC .. G06F 16/338; G06F 16/332; G06F 16/3332; H04L 51/02
See application file for complete search history.

(56) References Cited

U.S. PATENT DOCUMENTS 11,526,429 B1 * 12/2022 Dutta .................. G06F 11/3684
12,346,314 B1 * 7/2025 Guerra .................. G06F 16/235
(Continued)

FOREIGN PATENT DOCUMENTS

KR          102612833 B1 * 12/2023 ............. G06Q 10/10

OTHER PUBLICATIONS

Article entitled "Large Language Models for Supply Chain Optimization", by Li et al., dated Jul. 13, 2023. (Year: 2023).*
(Continued)

*Primary Examiner* — Mahesh H Dwivedi
(74) *Attorney, Agent, or Firm* — SCHWEGMAN LUNDBERG & WOESSNER, P.A.

(57) ABSTRACT

In an example embodiment, a design-time environment and a run-time environment. The design-time environment helps developers create and maintain configuration and other information that can be formed into chatbot runtime capabilities more easily. Developers can define what data can be accessed and how the data is to be filtered or displayed. The run-time environment is where the interaction with the user happens. When a user inputs a query, the system translates the query into a structured format that the enterprise resource planning (ERP) system can understand. This involves several steps, including identifying a capability that matches the query, generating a prompt for a large language model (using the capability), receiving an intermediate query representation, converting the intermediate query representation into a query, executing the query, and then processing the results to present them to the user.

20 Claims, 9 Drawing Sheets

(56)     References Cited

U.S. PATENT DOCUMENTS

| | | | | |
|---|---|---|---|---|
| 2018/0081871 A1* | 3/2018 | Williams | ................ | G06F 16/31 |
| 2020/0320133 A1* | 10/2020 | Yaramada | ............... | G06F 40/35 |
| 2020/0394190 A1* | 12/2020 | Chaudhuri | ........... | G06F 16/243 |
| 2021/0286950 A1* | 9/2021 | Quamar | ................ | G06F 40/295 |
| 2022/0222253 A1* | 7/2022 | Jouhier | .................... | G06F 8/51 |
| 2023/0110941 A1* | 4/2023 | Makhija | ................ | G06F 40/284 |
| | | | | 709/224 |
| 2024/0144039 A1* | 5/2024 | Seibel | .................... | G06F 40/30 |
| 2025/0036773 A1* | 1/2025 | Chihaia | ................... | G06F 16/22 |
| 2025/0265244 A1* | 8/2025 | Matusek | ............... | G06F 16/248 |
| 2025/0265529 A1* | 8/2025 | Kumar | ............ | G06Q 10/06393 |
| 2026/0003874 A1* | 1/2026 | Jootoo Ramesh Bapu | ................ | |
| | | | | G06F 16/24569 |

OTHER PUBLICATIONS

Article entitled "SAP Business AI", by SAP, dated 2023 (Year: 2023).*

Article entitled "Implementing Conversational AI Into ERP Software", by Sarferaz, dated Sep. 12, 2025 (Year: 2025).*

Article entitled "Enhancing LLM Fine-tuning for Text-to-SQLs by SQL Quality Measurement", by Sarkar et al., dated Oct. 2, 2024 (Year: 2024).*

Wong, Albert, "A Survey of Natural Language Processing Implementation for Data Query Systems", IEEE international Conference on Recent Advances in Systems Science and Engineering, (2021), 8 pgs.

\* cited by examiner

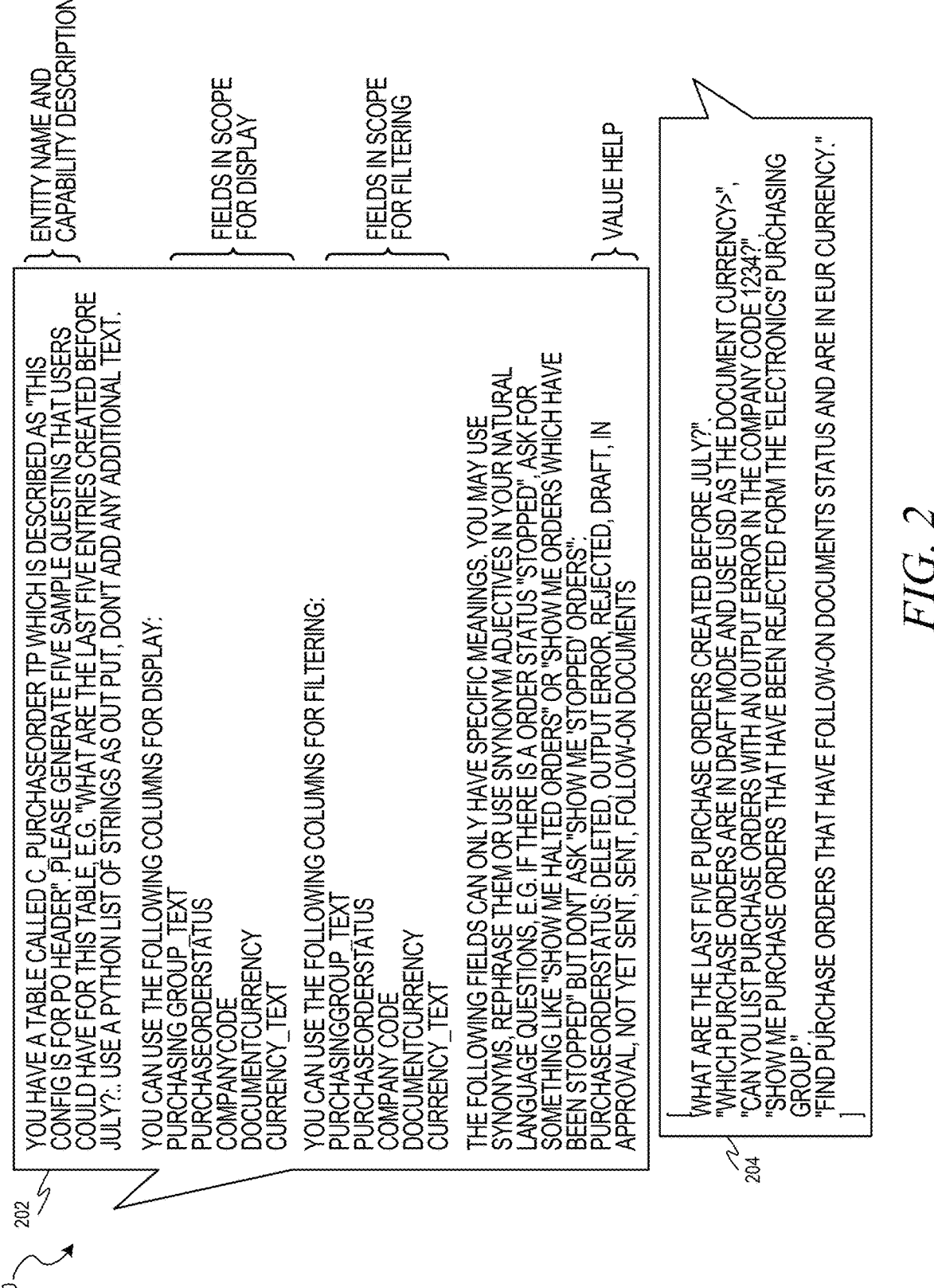

200

202

YOU HAVE A TABLE CALLED C_PURCHASEORDER TP WHICH IS DESCRIBED AS "THIS CONFIG IS FOR PO HEADER". PLEASE GENERATE FIVE SAMPLE QUESTINS THAT USERS COULD HAVE FOR THIS TABLE, E.G. "WHAT ARE THE LAST FIVE ENTRIES CREATED BEFORE JULY?". USE A PYTHON LIST OF STRINGS AS OUT PUT, DONT ADD ANY ADDITIONAL TEXT.
} ENTITY NAME AND CAPABILITY DESCRIPTION

YOU CAN USE THE FOLLOWING COLUMNS FOR DISPLAY:
PURCHASING GROUP_TEXT
PURCHASEORDERSTATUS
COMPANYCODE
DOCUMENTCURRENCY
CURRENCY_TEXT
} FIELDS IN SCOPE FOR DISPLAY

YOU CAN USE THE FOLLOWING COLUMNS FOR FILTERING:
PURCHASINGGROUP_TEXT
PURCHASEORDERSTATUS
COMPANY CODE
DOCUMENTCURRENCY
CURRENCY_TEXT
} FIELDS IN SCOPE FOR FILTERING

THE FOLLOWING FIELDS CAN ONLY HAVE SPECIFIC MEANINGS. YOU MAY USE SYNONYMS, REPHRASE THEM OR USE SNYNONYM ADJECTIVES IN YOUR NATURAL LANGUAGE QUESTIONS, E.G. IF THERE IS A ORDER STATUS "STOPPED", ASK FOR SOMETHING LIKE "SHOW ME HALTED ORDERS" OR "SHOW ME ORDERS WHICH HAVE BEEN STOPPED" BUT DONT ASK "SHOW ME 'STOPPED' ORDERS".
PURCHASEORDERSTATUS: DELETED, OUTPUT ERROR, REJECTED, DRAFT, IN APPROVAL, NOT YET SENT, SENT, FOLLOW-ON DOCUMENTS
} VALUE HELP

204

[ "WHAT ARE THE LAST FIVE PURCHASE ORDERS CREATED BEFORE JULY?",
"WHICH PURCHASE ORDERS ARE IN DRAFT MODE AND USE USD AS THE DOCUMENT CURRENCY>",
"CAN YOU LIST PURCHASE ORDERS WITH AN OUTPUT ERROR IN THE COMPANY CODE 1234?",
"SHOW ME PURCHASE ORDERS THAT HAVE BEEN REJECTED FORM THE 'ELECTRONICS' PURCHASING GROUP.",
"FIND PURCHASE ORDERS THAT HAVE FOLLOW-ON DOCUMENTS STATUS AND ARE IN EUR CURRENCY."
]

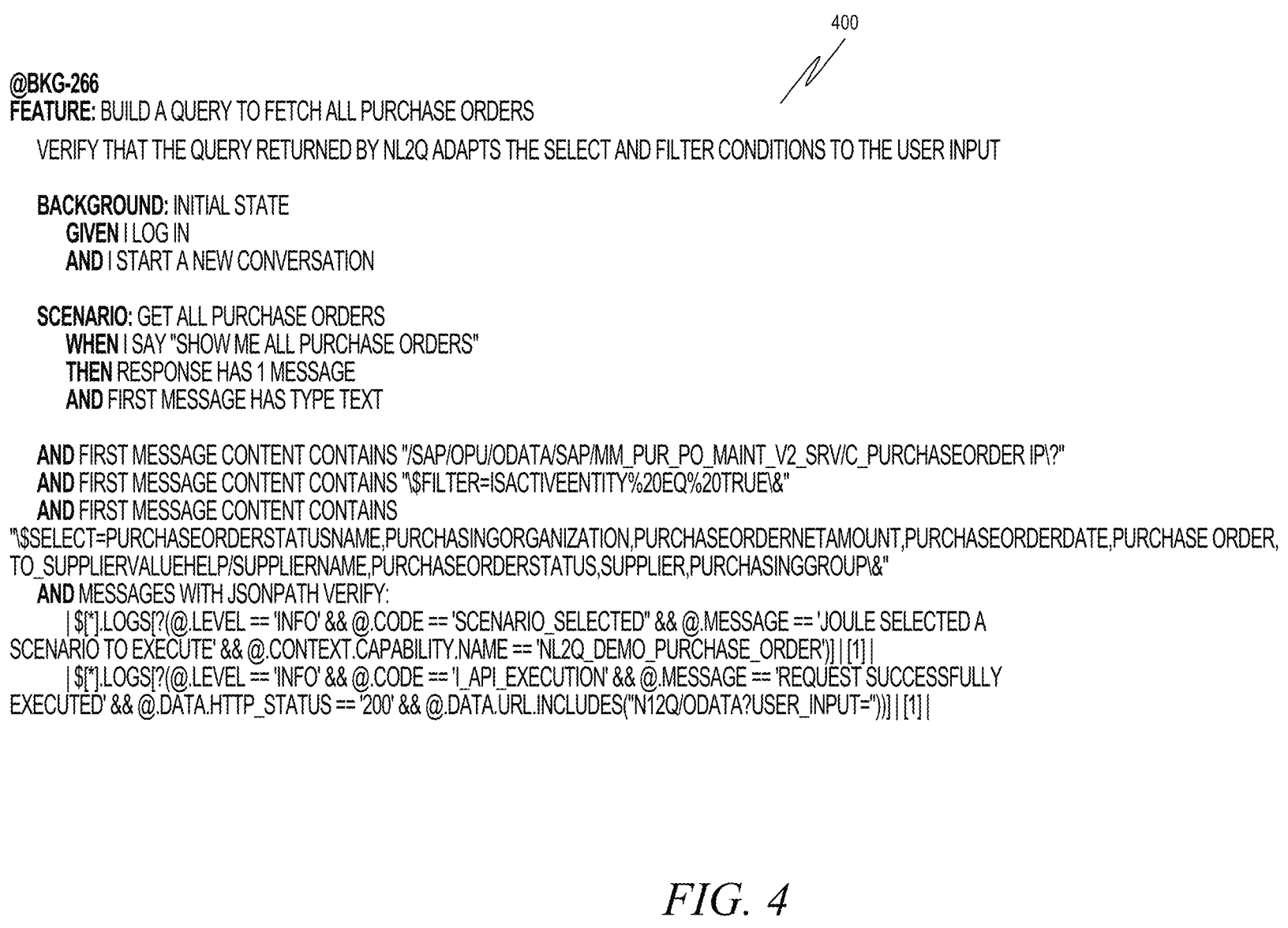

@BKG-266
FEATURE: BUILD A QUERY TO FETCH ALL PURCHASE ORDERS

VERIFY THAT THE QUERY RETURNED BY NL2Q ADAPTS THE SELECT AND FILTER CONDITIONS TO THE USER INPUT

BACKGROUND: INITIAL STATE
    GIVEN I LOG IN
    AND I START A NEW CONVERSATION

SCENARIO: GET ALL PURCHASE ORDERS
    WHEN I SAY "SHOW ME ALL PURCHASE ORDERS"
    THEN RESPONSE HAS 1 MESSAGE
    AND FIRST MESSAGE HAS TYPE TEXT

AND FIRST MESSAGE CONTENT CONTAINS "/SAP/OPU/ODATA/SAP/MM_PUR_PO_MAINT_V2_SRV/C_PURCHASEORDER IP\'?"
    AND FIRST MESSAGE CONTENT CONTAINS "$FILTER=ISACTIVEENTITY%20EQ%20TRUE\&"
    AND FIRST MESSAGE CONTENT CONTAINS
"$SELECT=PURCHASEORDERSTATUSNAME,PURCHASINGORGANIZATION,PURCHASEORDERNETAMOUNT,PURCHASEORDERDATE,PURCHASE ORDER,
TO_SUPPLIERVALUEHELP/SUPPLIERNAME,PURCHASEORDERSTATUS,SUPPLIER,PURCHASINGGROUP\&"
    AND MESSAGES WITH JSONPATH VERIFY:

|$[*].LOGS[?(@.LEVEL == 'INFO' && @.CODE == 'SCENARIO_SELECTED" && @.MESSAGE == 'JOULE SELECTED A
SCENARIO TO EXECUTE' && @.CONTEXT.CAPABILITY.NAME == 'NL2Q_DEMO_PURCHASE_ORDER')]|.[1]|

|$[*].LOGS[?(@.LEVEL == 'INFO' && @.CODE == 'I_API_EXECUTION' && @.MESSAGE == 'REQUEST SUCCESSFULLY
EXECUTED' && @.DATA.HTTP_STATUS == '200' && @.DATA.URL.INCLUDES("N12Q/ODATA?USER_INPUT="))]|.[1]|

*FIG. 4*

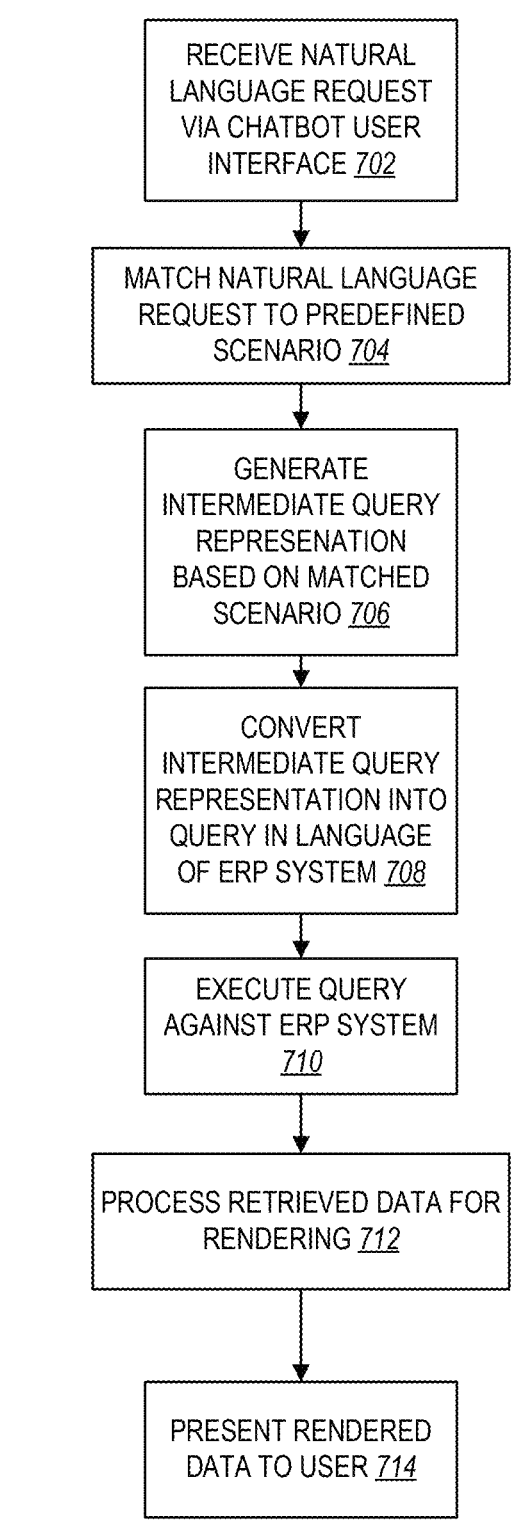

700

RECEIVE NATURAL LANGUAGE REQUEST VIA CHATBOT USER INTERFACE 702

MATCH NATURAL LANGUAGE REQUEST TO PREDEFINED SCENARIO 704

GENERATE INTERMEDIATE QUERY REPRESENATION BASED ON MATCHED SCENARIO 706

CONVERT INTERMEDIATE QUERY REPRESENTATION INTO QUERY IN LANGUAGE OF ERP SYSTEM 708

EXECUTE QUERY AGAINST ERP SYSTEM 710

PROCESS RETRIEVED DATA FOR RENDERING 712

PRESENT RENDERED DATA TO USER 714

*FIG. 7*

CHATBOT ACCESS TO ERP DATA USING LARGE LANGUAGE MODEL WITH INTERMEDIATE QUERY REPRESENTATION

TECHNICAL FIELD

Embodiments pertain to artificial intelligence and, in some examples, to natural language processing systems for interacting with enterprise resource planning (ERP) data.

BACKGROUND

In a computer system, software servers are often used to manage applications that interact with one or more software clients over a computer network, such as the Internet. An OData server is a type of web server that implements the Open Data Protocol (OData) to enable the creation and consumption of RESTful Application Program Interfaces (APIs) for data sources. OData is a protocol for creating and consuming data APIs that are consistent with RESTful principles and expose data as resources that can be accessed using standard HyperText Transfer Protocol (HTTP) methods like GET, POST, PUT, PATCH and DELETE.

An OData server allows developers to expose data from various sources such as databases, file systems, or web services as OData feeds, which can be consumed by client applications. The OData server maps the HTTP requests to the corresponding data operations and returns the data in a standardized format, typically JavaScript Object Notation (JSON) or Extensible Markup Language (XML). OData servers are used in various contexts, such as enterprise data integration, business intelligence, and mobile application development. They enable the creation of scalable and flexible APIs that can be consumed by a wide range of clients, including web and mobile applications, desktop software, and other backend systems.

BRIEF DESCRIPTION OF THE DRAWINGS

The present disclosure is illustrated by way of example and not limitation in the figures of the accompanying drawings, in which like references indicate similar elements.

FIG. 2 is a diagram illustrating an example of LLM-provided test cases, in accordance with an example embodiment.

FIG. 4 illustrates a comprehensive test without any filter condition, in accordance with an example embodiment.

FIG. 7 is a flow diagram illustrating a method of accessing an ERP system in a chatbot using an LLM, in accordance with an example embodiment.

DETAILED DESCRIPTION

Figure 1:
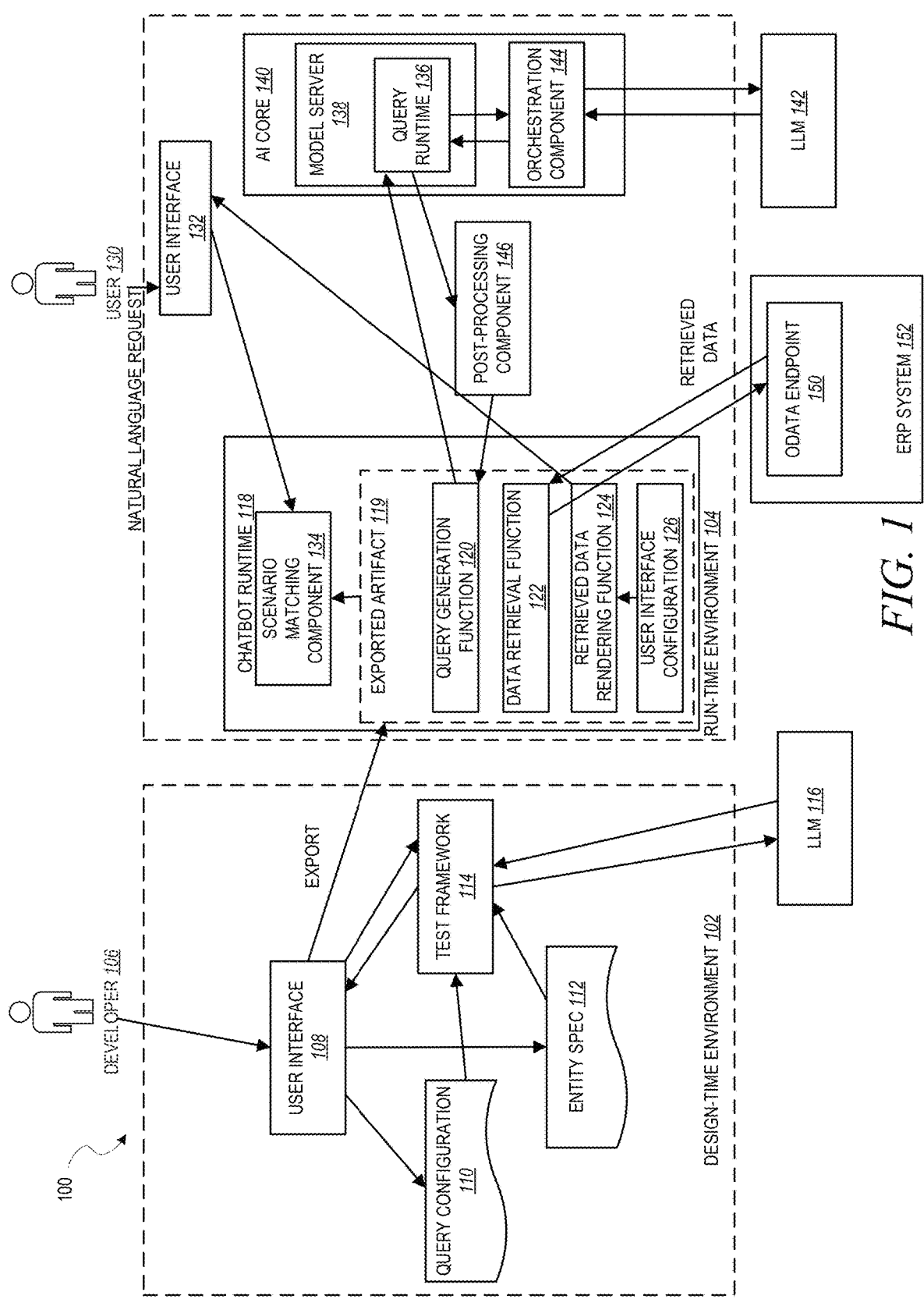
FIG. 1 is a block diagram illustrating a system for converting a natural language query into an ERP query, in accordance with an example embodiment.

The description that follows discusses illustrative systems, methods, techniques, instruction sequences, and computing machine program products. In the following description, for purposes of explanation, numerous specific details are set forth to provide an understanding of various example embodiments of the present subject matter. It will be evident, however, to those skilled in the art, that various example embodiments of the present subject matter may be practiced without these specific details.

Enterprise resource planning (ERP) systems are designed to manage and integrate various business processes through a centralized application. These systems facilitate the flow of information across different departments, such as finance, human resources, and supply chain management, by providing a unified platform for data management and reporting. A common challenge in ERP systems is the complexity of data retrieval and interaction. Users often need to access and manipulate large volumes of data stored in diverse formats and structures. This requires the use of structured query languages and a deep understanding of the underlying data models, which can be cumbersome and time-consuming.

The described examples focus on a technology called NL2Query, which is designed to improve chatbots to allow people to interact with complex data systems, specifically in the context of ERP systems. This technology allows users to communicate with these systems using natural language, like the way one would talk to a person, and then translates that input into a structured query that the system can understand and process.

The "Joule chatbot" is a digital assistant developed by SAP SE of Walldorf, Germany, to assist users in interacting with their ERP systems in a more user-friendly manner. Consider the Joule chatbot as a smart helper that users can communicate with, either by typing or speaking, to obtain information or perform tasks within a business software system.

Joule is designed to comprehend an inquiry and determine an appropriate way to respond. This is achieved by aligning the request with a set of predefined tasks, referred to as "scenarios," that Joule is equipped to manage.

Once Joule understands the request, Joule can access the required data from the ERP system. This means Joule can retrieve reports, check inventory levels, or even assist the user in creating new entries, such as a purchase order.

The challenge is that these systems typically require highly specific and structured commands to retrieve data, which can be difficult for nontechnical users to formulate.

More specifically, the capabilities of Joule are defined by a collection of Joule scenarios, each scenario covering a certain task, e.g., showing contact details for a colleague. Developers can extend Joule by writing their own scenarios. Each scenario comes with a description, which is used to match a user input to the scenario, an endpoint to yield the answer, and a list of so-called slots, which are the input parameters for the endpoint that is called scenario.

Joule selects the appropriate scenario for a given user input, populates the slots with information based on the user input, chat history and other information, and then calls a function that may trigger some action, collect information from a document store, or retrieve results from some data endpoint.

There are several technical issues encountered, however, when trying to extend Joule, or similar chatbot systems, to ERP data.

The first is that Joule uses a slot mechanism that represents simple statements, but this slot mechanism does not have the functionality to represent complex statements. Users expect that they can access transactional data using statements that map to complex filter requirements, such as "Show me approved purchase orders from 2024 and inactive purchase orders from this week." Joule's slot mechanism could handle a simple statement such as "status=approved and year=2024" but not the more complex statements.

Joule also does not provide for a mechanism to filter for a list of values (e.g., "inactive" may map to "status=paused or status=halted"). Additionally, Joule's range filters only support "greater or equal" and "lower or equal" but not the exclusive versions "greater than" or "lower than", which is required for ranges on integer quantiles. For example, "Show me purchase order items with a quantity exceeding 2" cannot be translated to "quantity >=2.01" or the like because it would cause a field type error.

Joule also does not provide a mechanism for nested Boolean statements, which are required for statements like "Show me unapproved items with a quantity exceeding 2 liter or 4 kg", which maps to "(quantity=2 and uom=ltr) or (quantity=4 and uom=kg)."

Furthermore, Joule does not natively support access to transactional data. Thus, each developer who wishes to provide access to transactional data needs to develop their own Joule capabilities to expose important business objects to make them accessible to user requests. This is a repetitive and complex high-effort task where each development group, such as a Line of Business (LoB), needs to train at least one developer who creates and maintains the Joule capabilities over time.

With decentralized maintenance of the capabilities, the Joule capabilities are at risk of providing inconsistent functionality, e.g., users might be able to filter for month of year for one business object but not for the other. Likewise, all LoBs would need to act consistently when new Joule features are released or (breaking) changes are introduced in Joule.

Furthermore, some data sources come with a list of allowed values, each with a dedicated meaning. More specifically, properties with so-called domain fixed value help utilize such allowed value lists. This poses a technical challenge since a developer needs to identify the list of allowed values and their meanings (and keep this list updated over time) and put the information about all possible values into the slot description. The list of allowed values may, however, wind up missing values, and putting too many values into the slot description can exceed the character limit for the description field.

The presently disclosed technology also addresses the complexity of development. In many systems, data is stored in a manner that requires developers to understand and manage complex relationships between different data points. For example, a purchase order status might be stored as a number, but the meaning of the purchase order status is detailed in a separate table. Developers need to keep track of these relationships, which can be challenging and error-prone.

The described examples offer a solution by providing a design-time environment and a run-time environment. The design-time environment helps developers create and maintain configuration and other information that can be formed into Joule capabilities more easily. This environment includes a user-friendly interface that reduces the time and effort needed to set up and manage these capabilities. Developers can define what data can be accessed and how the data is to be filtered or displayed.

The run-time environment is where the actual interaction with the user happens. When a user inputs a query, the system translates the query into a structured format that the ERP system can understand. This involves several steps, including identifying a capability that matches the query, generating a prompt for a language model (using the capability), receiving a query, executing the query, and then processing the results to present them to the user.

The technology also integrates with large language models (LLMs), which are advanced AI systems capable of understanding and generating human-like text. These models help translate the natural language input into structured queries. They can also handle more complex tasks, like planning a sequence of actions to achieve a specific goal.

The run-time environment also serves as an interaction point for tooling in LLM scenarios, which gives the LLM access to transactional data to fulfil complex tasks.

An additional technical problem that can be encountered is that when dealing with multiple ERPs, or even multiple portions of a single ERP, there may be endpoints that use different data standards. For example, one endpoint may use OData v4 while another endpoint may use OData v2, while other endpoints may use Structured Query Language formats such as HANA SQL, Signavio Analytics Language (SIGNAL), etc.

While the general structure, e.g., a list of columns and row filter conditions, can be the same from ERP query language to ERP query language, the actual syntax and scope of filter predicates varies, e.g.:

While HANA SQL and OData v4 both offer a substring search based on regular expressions, the predicates have different names, while SIGNAL does not support this functionality at all.

HANA SQL uses a filter predicate "BETWEEN" for any ranges while SIGNAL only offers DURATION_BE-TWEEN specifically for date ranges.

Unlike OData v2, OData v4 allows for filters on nested data structures with 1:n cardinality that are accessible via navigations.

OData v2 and OData v4 use different representations for dates and times: OData v2 only knows Datetimes without timezone, whereas OData v4 distinguishes between Date and Datetimeoffset, where the latter is a timestamp with timezone information.

While one possibility is to have the LLM queries directly in the desired query language, there are technical issues that are encountered when trying to do so in multiple different languages. Specifically, while there is some standardization and many identical elements across databases, there are also differences such as different names for predicates or filter conditions. As such, LLMs struggle to consistently adhere to specific vendors' "dialects" of SQL, and will frequently fail because the dialect is application-specific or is too new to be included in the LLM training corpus.

Another possibility would be to have a unique prompt for each different query language. Those prompts could provide additional context related to the query language, such as supported filter predicates. This, however, adds too many input tokens for the LLM, which causes processing delays and increased LLM costs. Additionally, there is no guarantee that the language-specific information is enough to avoid the generation of invalid queries by the LLM.

Another possibility would be to introduce a data layer having a common SQL interface that mediates the communications to the different data endpoints. A HANA database service could offer a variety of adapters for different endpoints and handle end-to-end user authentication. However, the setup for such an architecture would be difficult to deploy within cloud landscapes. Furthermore, any hand-made data layer would incur authorization challenges, such as the difficulty in forwarding proper authentication tokens, when mediating towards different endpoints.

In an example embodiment, an intermediate representation of each query and its filters is introduced. This simplifies the maintenance of an input prompt as it can be separated into a prompt describing the query task and a prompt describing the syntax and elements of an intermediate query representation. The latter may be generated dynamically based on an endpoint's query language and on smaller building blocks for predicates and other elements. After the LLM call, a post-processing component translates the intermediate query representation into the needed target query language for the endpoint (e.g., OData v4). As the intermediate query representation is not too similar to existing query languages, the LLM tends to follow the description from the prompt and is less prone to hallucinations that could lead to invalid queries.

The maintenance of different query languages is reduced to the maintenance of the different languages' scopes, such as the list of allowed predicates for filter in the intermediate languages. A downstream component can ensure the created query is syntactically correct.

FIG. 1 is a block diagram illustrating a system 100 for converting a natural language query into an ERP query, in accordance with an example embodiment. The system 100 comprises a design-time environment 102 and a run-time environment 104. It should be noted that while the design-time environment 102 and the run-time environment 104 are depicted as separate environments, in some example embodiments some or all of their underlying components may be shared.

Beginning with the design-time environment 102, a developer 106 interacts with a user interface 108 to define and maintain chatbot capabilities in a consistent manner. Specifically, the developer 106 uses the user interface 108 to define a query configuration 110. The query configuration 110 references a data model, such as S/4 Public Cloud, and a specific entity set in a certain service within this data model. The developer 106 begins by selecting an endpoint, such as an OData endpoint. In S/4 systems, the endpoints are represented by an entity (or entity set) that is based on a Core Data Services (CDS) view. CDS is a technology used to define and manage data models. This technology enables developers to create a structured representation of data, which can be used to access and manipulate data efficiently within applications.

CDS may be thought of as a blueprint for how data is organized and accessed in a software system. CDS helps developers specify what data is available, how the data is related, and how the data can be queried or updated.

CDS views, which are built using CDS, provide a way to define these data models. CDS views allow developers to create virtual tables that combine data from different sources, making the process of working with the data more straightforward without having to deal with the complexities of the underlying database structure.

The entity comprises, among other metadata, all exposed fields, their properties, and the connection to underlying data entities in the S4 data model, such as other CDS views or Advanced Business Application Programming (ABAP) tables.

The developer 106 may be provided with an interface for a text-based search for services and entity sets. Once defined, all information from the corresponding knowledge graph can be collected and used to build an entity spec. In this step, the developer may also provide a name and a description for the new capability. In addition, the developer 106 defines which operations (read, create, update, delete) should be supported by the capability.

Furthermore, the developer 106 can provide a list of "hints", for each method, that are added to the prompt during prompt generation to guide the LLM in difficult situations and inject business information that is not accessible from the data model itself (e.g., "Overdue demand is demand where demand end date is in the past, demand status is not closed). Auxiliary options and information complete the query configuration 110, such as default ordering criteria or mandatory filters.

More specifically, while one can usually deduce the meaning of fields based on their name and description and the meaning of certain fields via domain-fixed value help, not all business aspects can be covered and thus not all user inputs can be appropriately answered using this set of information. Hence, the developer 106 can also provide additional information in the form of the aforementioned hints that specify business knowledge on fields or filter conditions. While the latter could be done in a programmatic way (e.g. via if/then conditions), natural language techniques may be utilized to keep it simple for the Joule capability developers and provide enough flexibility to the LLM.

Examples for hints are:
(1) "If asked for a generic amount, use the net amount": This hint ensures that for an endpoint with multiple amount columns, the most relevant amount column is selected when the user does not specify the requested amount in more detail (e.g., "What is the amount of the last order?").
(2) "Overdue demand is demand where the project demand end date is in the past and the still to be delivered quantity is larger than zero": This hint allows NL2Query to translate questions related to "overdue demand" into a set of filters on the end date and a specific quantity column rather than guessing wrong filter conditions.

This is a powerful approach to inject business knowledge and can be easily used by Joule capability developers from the LoB.

CDS views, which are the foundation for entities, allow for a logical structuring of data and offer references to other objects that are represented as navigations. A purchase order object has properties (or fields) such as status, creation date, or total amount, but also navigations to line items, supplier information, or invoice address, which themselves have properties. This indirect connection can be of cardinality 0-to-1 (e.g., invoice address which is optional), 1-to-1 (e.g., each purchase order has exactly one supplier) or one-to-many (e.g., each purchase order can have an arbitrary number of line items). Properties behind navigations with 0-to-1 or 1-to-1 cardinality can be used for selection, filtering, and updates in OData v2, while other query languages such as OData v4 also allow for filtering on properties behind navigations with 1:n cardinality. The Joule capability developer can also select these indirect fields for selection, filtering, and updating.

Additionally, in an example embodiment, in order to set the groundwork for an intermediate query representation to be generated, the query configuration 110 may be augmented with an indicator of the desired query language for the specific endpoint (e.g., "OData v2", "OData v4", "Signavio SQL", "HANA SQL" or the like). Internally, this indicator may be connected to a list of filter predicates and other properties of the intermediate query representation. As before, it also contains information on the supported operations (e.g., read, create, update, delete), the available fields for the different operations, value help for fields, business-specific hints for the LLM, and other information required to perform the task.

The entity spec 112 comprises all information on the entity, i.e., the data endpoint. There are also fields directly associated to the entity and fields indirectly associated via so-called navigations. A navigation allows relationships among objects to be exposed, e.g., a purchase order entity might have a navigation property referring to the supplier for the purchase order.

All direct properties, i.e., each field in the entity, may be stored in the entity spec together with its name, description, type (string, date, . . . ), maximum length, and flags indicating whether the field can be null, is a key field, can be selected, or can be used for filtering. The allowed field values and their descriptions for fields that have a fixed set of allowed field values (domain-fixed value help) may also be stored. This information is derived from the Knowledge Graph by following the corresponding connections.

For each entity referenced as navigation, the cardinality of the entity relationship (one-to-one, one-to-many, many-to-many) may be stored along with all properties connected to the navigation with the same values as for the direct properties.

Additionally, the domain-fixed value help information, i.e., information on numeric status fields that occur in a master table but are translated into short natural language texts in a separate value help table, may be loaded. While this connection is often just one join to get from the master table to the value help table, there are also fields with more complex join conditions. As a knowledge graph is used for the data model representation, this connection can be made regardless of the complexity of the join condition.

Deploying the configured query capability into a chatbot environment involves multiple steps. In order to prevent errors, a test framework 114 may test the provided capabilities. Specifically, the developer 106 may, via the user interface 108, enter some typical user input and get a generated OData query both in a simplified user-friendly representation and in its raw form, which can be executed manually against an arbitrary ERP system. For some pre-configured test systems, the developer 106 can also retrieve the data and check the results. It is noteworthy that at this step, the user-friendly representation of the statement is the most productive way of checking.

Developers may, at this step, note that additional business information in the form of hints is required or that more fields need to be exposed for display or filtering to answer all envisioned test inputs. Thus, this is an iterative approach switching back and forth between the configuration of the capability and the testing of the capability.

Additionally, in some example embodiments, testing functionality may be extended so that the developer 106 can store test inputs together with expected results, which can then be re-run automatically when changes to the capability are made, e.g., additional hints are added. These test cases are also input to automatic acceptance tests for the chatbot that the developer can export. Exporting of such an artifact will be described in more detail below.

There is also the possibility to generate user inputs for test cases automatically to support the developer 106. Specifically, an LLM 116 may be prompted for possible user inputs. FIG. 2 is a diagram illustrating an example of LLM-provided test cases 200, in accordance with an example embodiment. Specifically, a developer 106 may provide a description of what the user wants to happen. The test framework 114 then automatically generates a prompt 202 using the name of the entity, the description from the developer 106, the properties selected by the developer for display and filter help and the value help from the entity spec. This prompt 202 may be provided to the LLM 116, which generates a list of possible test user inputs 204, which is a list of possible user inputs that the developer 106 can use as starting point for test cases. The developer 106 runs these generated possible tests user inputs 204 and then manually confirms or corrects the generated statement before persisting it in a list of test cases. It is noteworthy that the filter conditions in the generated test user inputs 204 (and in general for the test cases within the design time environment) do not have to be realistic, e.g. it is acceptable to ask for a fictious purchasing group or a date in the future, as only OData query generation is being tested and not the results of executing this OData query against a specific system.

The developer 106 may also specify how the fields are presented when rendering the results and what labels they should have. The developer 106 can specify this for the title, the subtitle and the detailed description for the list view rendering, among others.

In addition, the developer 106 also may specify the rules to generate the uniform resource locator (URL) navigating to the details screen. Specifying the semantic object, the action and the key fields the URL can later be generated automatically, e.g., "/ui#PurchaseOrder-manage?Purchase-OrderID=4500008999"

While the definition of the user interface rendering is not needed at design time, it can be included in the exported artifact so that the artifact is self-contained, and thus that can be used in build pipelines without further human intervention.

Figure 3:
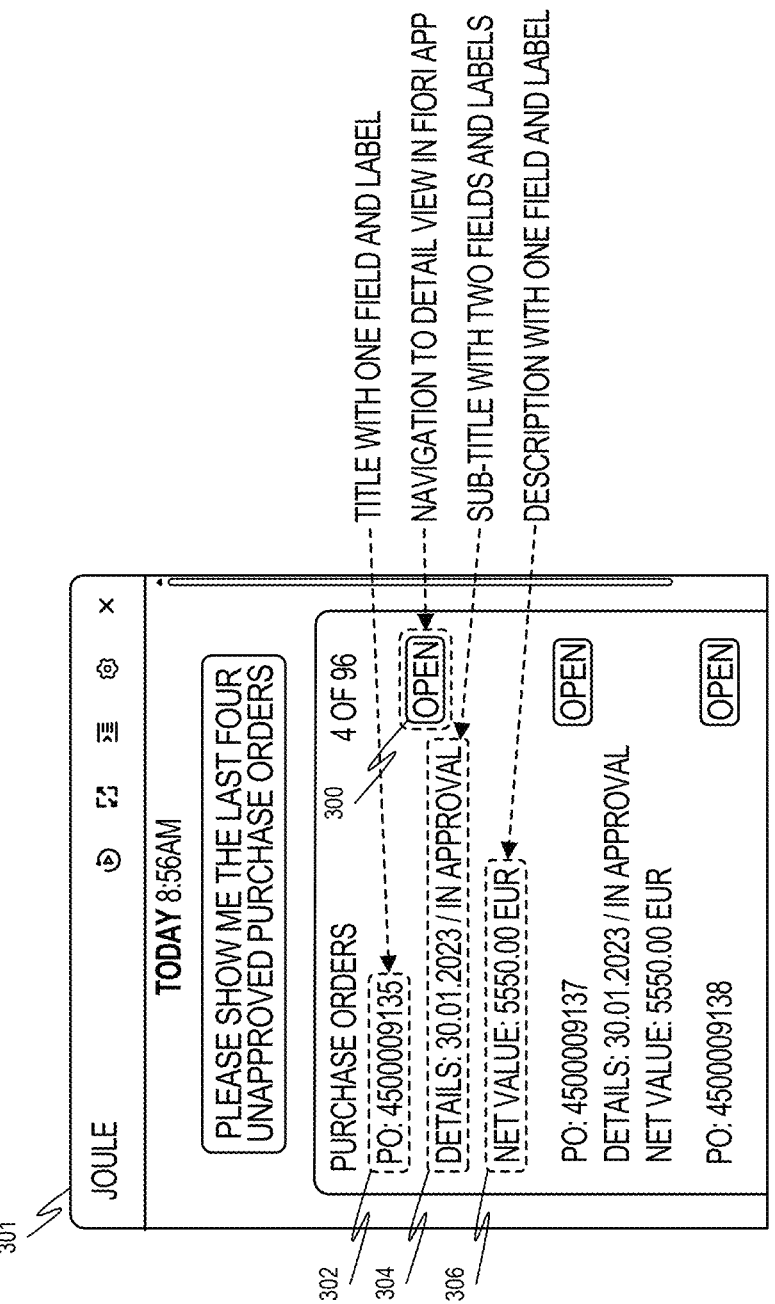
FIG. 3 is a screen capture illustrating an example of user interface configuration aspects that can be specified by the developer.

FIG. 3 is a screen capture illustrating an example of user interface configuration aspects that can be specified by the developer 106. Specifically, user interface elements such as an "open button" 300 may be provided within a graphical user interface 301. Additionally, the specific fields or combinations of fields 302, 304, 306 to be included with each presented result may be specified, as well as a corresponding format for each field. For example, a purchase order identification field 302 may be specified as being in a certain font and beginning with the characters: "PO:". A details field 304 is actually a combination of two fields, a date field and a status field, with corresponding font and labels.

Once the iterative cycle of configuration and testing is done, the developer 106 exports the files required to set up the capability in the chatbot runtime 118. These are design-time artifacts which are then compiled into chatbot run-time artifacts.

For the export, the query configuration 110 may be combined with a reduced version of the entity spec 112. For performance reasons, all information that is not needed, e.g., fields not specified in the query configuration 110, are removed from the entity spec 112 to yield the reduced version.

The exported artifact 119 comprises a chatbot scenario with three functions: a query generation function 120, a data retrieval function 122, and a retrieved data rendering function 124, as well as a user interface configuration 126 for the rendering. The Query generation function 120 calls the run-time environment 104 to generate an OData query for the given user input. The function call includes the prepared context with the query configuration 110 and the reduced entity spec 112.

The data retrieval function 122 retrieves the data, given the OData query. The retrieved data rendering function 124 renders the retrieved data, e.g., a list view, based on the user interface configuration 126.

Furthermore, in some example embodiments, comprehensive tests may be run when exporting the artifact, which are used to test the chatbot capability end-to-end. The tests are in a structured format and use a certain user prompt as input to then verify the resulting output, e.g., probing the existence of certain fields or filters in the created OData query. The questions can be generated either via the LLM 116 or manually by the developer 106, and then the defined test cases may be used to populate a test template.

FIG. 4 illustrates such a comprehensive test 400 without any filter condition, in accordance with an example embodiment. Here, the comprehensive test 400 involves a feature to build a query to fetch all purchase order.

It should also be noted that the export functionality may be provided via an endpoint (and not just as a button on a user interface). This allows LoBs to export the artifact as part of their automated workflows and deploy the artifact without additional manual interventions.

Figure 5:
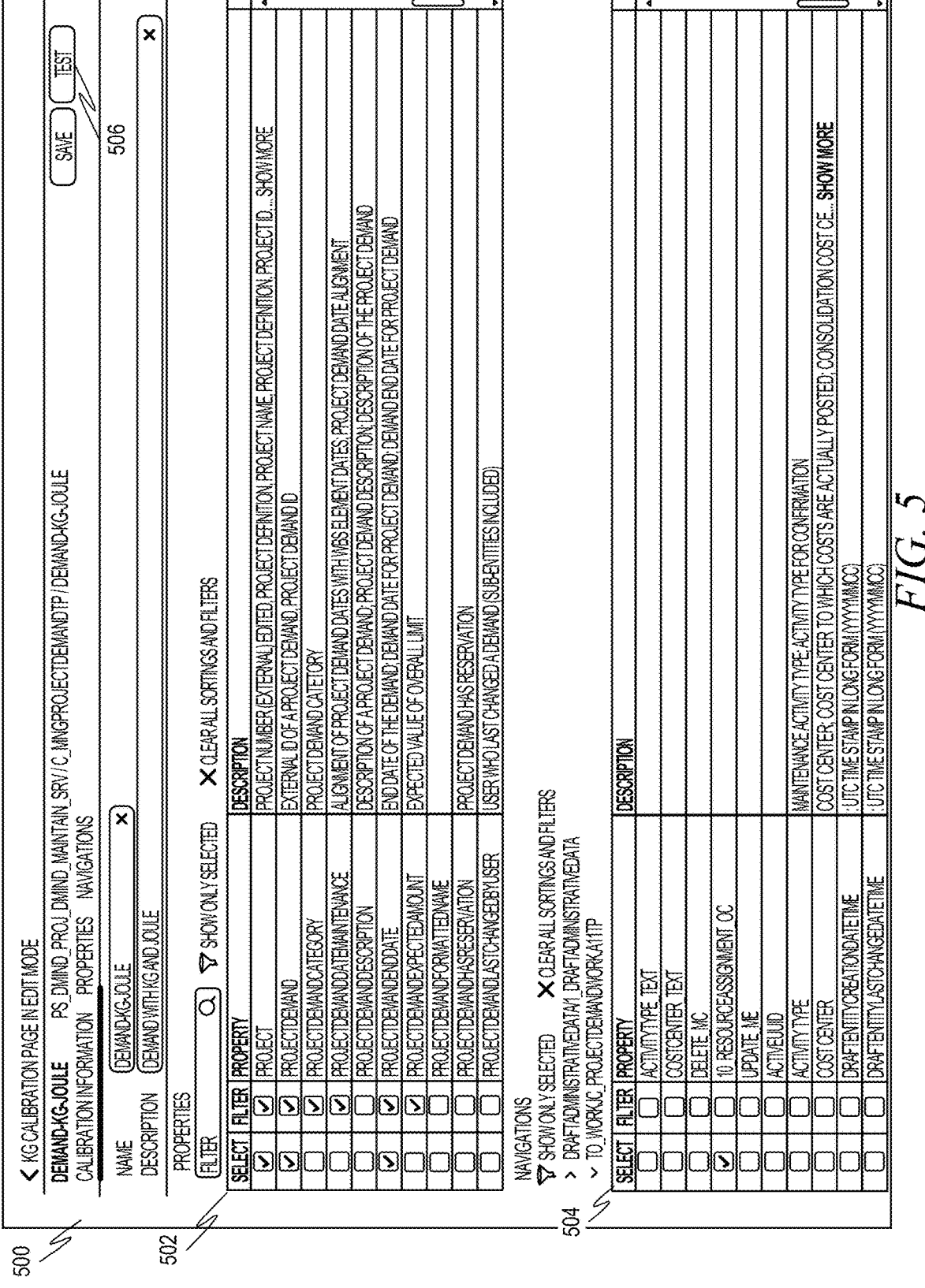
FIG. 5 is a diagram illustrating a screen capture of a user interface in which a developer can select the properties and navigation properties that are later accessible to the user.

FIG. 5 is a diagram illustrating a screen capture of a user interface 500 in which a developer can select properties 502 and navigation properties 504, which are later accessible to the user. A test button 506 is also provided to allow the developer to run the aforementioned testing of the capability.

Referring back to FIG. 1, the run-time environment 104 contains a chatbot runtime 118 that contains the query generation function 120, data retrieval function 122, and retrieved data rendering function 124, as well as the user interface configuration 126, from the exported artifact from the design-time environment 102. A user 130 interacts directly with the chatbot runtime 118 to provide user input, in the form of user utterances, which are natural language queries (such as questions) asked within a chatbot window. Communication by the user 130 with the chatbot runtime 118 may be performed via a user interface 132.

A scenario matching component 134 within the chatbot runtime 118 takes the utterances from the user 130 and matches them with a scenario. The scenario may be the one designed by the developer 106 or may be another scenario. In this example, it may be assumed that the matching scenario is the one designed by the developer 106. This matching of the user utterances to the specific scenario at hand causes the chatbot runtime 118 to load the query generation function 120, data retrieval function 122, and retrieved data rendering function 124, and the user interface configuration 126, from the exported artifact from the design-time environment 102 and execute the functions.

First, the query generation function 120 is executed. This causes a call to a query runtime 136 located on a model server 138 of an Artificial Intelligence (AI) Core 140. The query runtime 136 builds a prompt based on the user utterances, the query context, and any additional pieces of information. The query context includes, among other things, value help information, field types, semantics and a list of mandatory fields for filtering or displaying, obtained from the exported artifact. Additional information includes context information, e.g., previous elements of the conversation, user context, e.g., the username or the user's preferred language or datetime format, and application context, e.g. information provided by the current application where the user 130 is interacting with the chatbot runtime 118. The application context may contain information such as the technical identification of a business object that is currently shown or filters that have been set by the user 130 in the current user interface 132. It should be noted that many of these pieces of information are optional, and operation of the query generation process can be performed using a little as the user utterances and the query context.

The query runtime 136 generates the prompt comprising the following elements:

(1) A generic description of the query task (e.g., the main instructions giving some context to the LLM).

(2) A description of intermediate query representation tailored to the scope of the desired query language as indicated in the query configuration.

(3) The list of fields that are available for the request tasks, e.g., fields to display and filter for read scenarios or fields that can be updated for update scenarios.

The prompt is ordered in such a way that the static parts come first, allowing for caching large parts of the prompt in LLM calls. While this is not supported by all LLM providers, it can reduce both costs and latency significantly when supported.

The query runtime 136 takes the generated prompt and forwards it to LLM 142. It should be noted that while LLM 142 is depicted as being different than LLM 116, in some example embodiments they may be the same LLM. Adhering to the instructions, LLM 142 generates an intermediate query representation based on predefined building blocks and only blocks relevant for the specified language from the query configuration. These blocks can describe various aspects of the intermediate query representation:

Filter predicates: Based on the desired query language for the specific endpoint, we add all filter predicates to the prompt that are possible plus some explanation of their meaning and examples on how they are used. While comparisons and range filters are possible in virtually every language, filters on text vary. For example, SIGNAL, Signavio's SQL dialect, does not support substring searches using regular expressions while HANA SQL and OData v4 offer this functionality.

Aggregation predicates: Some query languages, especially SQL dialects, allow for aggregations of fields; e.g., user input such as, "What is the sum of all revenues in French stores?" can be translated into a valid query, while this is usually not the case for OData dialects. The scope of aggregate predicates (sum, count, distinct count, min, max, median, . . . ) varies in different SQL dialects and hence only the blocks that are supported are added in the indicated query language for the specific endpoint. Again, the blocks include a description of each predicate and examples.

Filter structure: The building block may define whether the filter representation can be a complex nested structure or not. While all query languages usually allow for arbitrarily nested filter statements using Boolean algebra and parentheses, it is sometimes necessary from a user experience perspective to limit the filter complexity. In some instances, only a combination of Boolean "and" operators are allowed, i.e., "year=2024 and user=Hans and status=unapproved" is allowed while "year=2024 and (user=Hans or status=unapproved)" is not allowed.

Any other information limiting the scope of the intermediate query representation to ensure that a valid query can be constructed in the post-processing step.

As before, the output syntax for the filter statement is defined as a grammar including all allowed predicates and operators. With the support for multiple languages, the grammar definition is of course different for each target language.

The communication between the query runtime 136 and the LLM 142 may take place via an orchestration component 144, which may be a proxy for communicating with the LLM 142.

A post-processing component 146 then performs post-processing on the response. This may include translating the intermediate query representation into the actual query language for the specified endpoint. The results of the LLM call are converted into an abstract representation in memory (e.g., the text output is parsed) and then converted into the target query language.

In a first step, the list of selected fields-including fields that are marked as mandatory in the NL2Query Context—is converted into a selection statement. Often this happens through a simple concatenation of the field names, but for OData endpoints it may also require expanding navigations, i.e., indirect references to nested data elements (e.g., a supplier reference in a purchase order when the user asks to see the suppliers for certain purchase orders). For SQL endpoints, certain selected fields might require adding "join" statements to combine additional tables (similar to navigations), which can be omitted when not needed.

The filter statement as given by the LLM is parsed and stored as an abstract syntax tree in memory to be converted into the target query language:

Each atomic condition needs to be translated into an atomic condition in the target query language. For each operator (eq, ne, lt, gt, le, ge, contains, startswith, . . . ) the corresponding predicate is looked up for the specific query language and combined with the field and the value(s). E.g., a "contains" filter operation becomes "contains (<field>, <value>)" in OData and "<field> like '%<value>%" in SAP HANA SQL. The lookup of the predicate may also depend on the involved data types, e.g., Signavio's SQL dialect SIGNAL includes a dedicated predicate for the duration ranges (compared to numeric ranges).

The tree structure itself is converted into Boolean expression using Boolean operators ("and", "or" and "not") in the target language's syntax as well as parentheses to group them. (So far, we have not seen any query language that would require a prefix notation or other parenthesis-free notation, but it would also be possible.)

Any ordering criteria or limits for the number of entries in the result dataset are added in the target query language.

Based on the target language query, the generation of the query may also include optimization steps such as combining multiple comparisons for equality on the same field into one short statement.

Finally, the post-processing module can also check the validity of the generated query again before returning it or throw an exception. It is noteworthy that the deterministic conversion code in post-processing (compared to direct code generation via LLMs) reduces the risk of invalid queries due to hallucination. It also reduces the risk of prompt injection attacks since the resulting queries are generated and checked by deterministic code. In addition, standard methods of traditional software development such as unit testing can be applied easily.

At this point, with the return of the translated query, the query generation function 120 is complete. The chatbot runtime 118 then executes the data retrieval function 122, which executes the translated query against an endpoint, such as OData endpoint 150 located in ERP system 152. The data returned from the OData endpoint 150 may be in structured form (JSON or XML, for example).

The chatbot runtime 118 then executes the data rendering function 124, which uses the user interface configuration 126 to render the user interface 132 in compliance with the user interface configuration 126 and using the response data from the OData endpoint 150. This rendering may only use information on omitted fields for filtering and displaying to notify the user 130 that the user intention was understood but could not be executed because the corresponding fields are not exposed for filtering or displaying.

Figure 6:
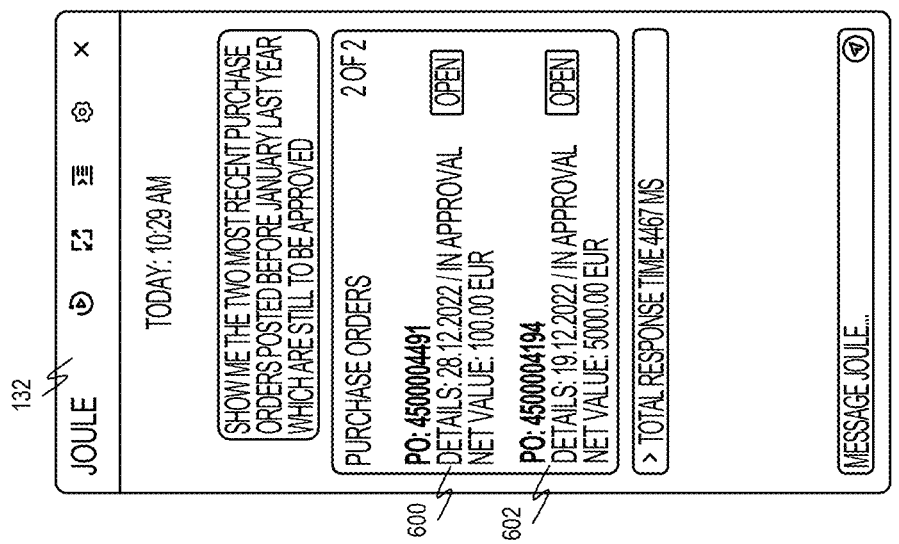
FIG. 6 is a screen capture illustrating an example of the rendered user interface, in accordance with an example embodiment.

FIG. 6 is a screen capture illustrating an example of the rendered user interface 132, in accordance with an example embodiment. Here, for example, the user interface 132 is rendered based on the previously described user interface configuration 126, but populated with purchase orders 600, 602 retrieved from the corresponding OData endpoint 150.

It should also be noted that while the user 130 is depicted in FIG. 1 as being a human, in some example embodiments the user 130 may be replaced with or combined with a computer agent, such as an LLM agent. Here, an LLM agent may plan a sequence of tool calls to yield a specific result. In such a scenario, the LLM agent might call the Query generation function 120 and data retrieval function 122 directly, and further process the results. As an example, the user could ask: "Create a bonus award of 1000€ to all employees in my team who are more than six months with the team," and the LLM agent could come up with the following reasoning and execution plan for tools:

First, I need to find all employees who are more than six months in my team. To get this information, I call the NL2Query scenario providing information on employees with the user's context and the user input, "Give me all user IDs for employees in my team who have joined more than six months ago." Now I can call the giveBonus scenario for each employee in the result set with bonus=1000 as parameter. Finally, I formulate a response to the user based on the success of the previous calls.

As to the structure of the LLMs 116, 142 themselves, LLMs used to generate information are generally referred to as Generative Artificial Intelligence (GAI) models. A GAI model may be implemented as a generative pretrained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order. Each direction has its own hidden state, and the final output is a combination of the two hidden states. By processing the input sequence in both directions, bidirectional encoders can capture more contextual information and dependencies between words, leading to better performance.

The bidirectional encoder may be implemented as a Bidirectional Long Short-Term Memory (BILSTM) or BERT (Bidirectional Encoder Representations from Transformers) model.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake. The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier. The present solution works with any type of GAI model.

In an example embodiment, the transformer architecture includes a multi-head attention mechanism. Instead of using a single attention mechanism, multi-head attention employs several attention heads, each capable of learning to focus on different aspects of the input. This diversity helps the model capture a wider range of relationships within the data.

The process begins with the input, represented as a set of vectors. Each input vector is transformed into three different representations: queries, keys, and values, using learned weight matrices. For each attention head, scores are calculated by taking the dot product of the queries and keys. These scores are then scaled and passed through a softmax function to obtain attention weights, which are used to compute a weighted sum of the values.

After processing through all the heads, their outputs are concatenated and transformed by a linear layer, integrating the information gathered from different attention heads. This approach not only allows the model to learn complex relationships but also enables efficient parallel computation.

Ultimately, multi-head attention is typically followed by additional layers, such as feed-forward networks and layer normalization, creating a complete transformer block. This mechanism significantly enhances the model's ability to understand and generate text, making it effective for tasks like translation and summarization FIG. 7 is a flow diagram illustrating a method 700 of accessing an ERP in a chatbot using an LLM, in accordance with an example embodiment. Although the example method 700 depicted in FIG. 7 shows a particular sequence of operations, the sequence may be altered without departing from the scope of the present disclosure. For example, some of the operations depicted may be performed in parallel or in a different sequence that does not materially affect the function of the method 700. In some examples, different components of an example device or system that implements the method 700 may perform functions at substantially the same time or in a specific sequence.

At operation 702, the method 700 begins with receiving a natural language request via a chatbot user interface. Operation 702 is performed by the user interface component, which captures the input as text or converts spoken input into text using a speech-to-text module. The input serves as the initial data for processing and is crucial for determining the user's intent.

At operation 704, the system matches the natural language request to a predefined scenario. The scenario matching component 134 analyzes the input to identify the most relevant scenario from a set of predefined scenarios. This involves parsing the input for keywords and context that align with specific tasks the system can perform. In some examples, the system may use machine learning algorithms to improve the accuracy of scenario matching.

At operation 706, the system generates an intermediate query representation based on the matched scenario. The query generation component translates the natural language input into the intermediate query representation by generating a first prompt using the natural language request and the matched scenario and sending the first prompt to an LLM.

At operation 708, the intermediate query representation is converted into a query, in a language corresponding to an ERP system. At operation 710, the query is executed against the ERP system. The data retrieval component sends the query to the appropriate data endpoint, which may be an S/4 system or another database service with a supported query language. The system retrieves the requested data and prepares it for further processing At operation 712, the system processes the retrieved data for rendering. The data rendering component formats the data according to predefined rules and user preferences. This may involve converting data types, applying user-specific formatting, and organizing the data into a user-friendly display.

At operation 714, the rendered data is presented to the user. The user interface component displays the results in a format that is easy to understand and interact with.

In view of the disclosure above, various examples are set forth below. It should be noted that one or more features of an example, taken in isolation or combination, should be considered within the disclosure of this application.

Example 1 is a system comprising: at least one hardware processor; and a non-transitory computer-readable medium storing instructions that, when executed by the at least one hardware processor, cause the at least one hardware processor to perform operations comprising: receiving a natural language request via a chatbot user interface; matching the natural language request to a first scenario of a plurality of scenarios managed by a chatbot runtime, the first scenario defining three functions for accessing data in an Enterprise Resource Planning (ERP) system; executing a first function of the three functions, causing a query runtime to: generate a first prompt using the natural language request and the first scenario; send the first prompt to a Large Language Model (LLM); receive an intermediate query representation; and convert the intermediate query representation into a query, in a language corresponding to the ERP system; executing a second function of the three functions, causing the query runtime to run the query on the ERP system to retrieve ERP data; and executing a third function of the three functions, causing the query runtime to render the ERP data in the chatbot user interface.

In Example 2, the subject matter of Example 1 includes, wherein the first scenario additionally defines a first user interface configuration, and wherein the executing of the third function further comprises altering display parameters of the chatbot user interface based on the first user interface configuration.

In Example 3, the subject matter of Examples 1-2 includes, wherein the first prompt further comprises one or more hints provided by a designer of the first scenario, the one or more hints comprising at least one definition, not available in a data model of the first scenario, of one or more terms.

In Example 4, the subject matter of Examples 1-3 includes, wherein the first prompt further comprises an application context.

In Example 5, the subject matter of Examples 1~4 includes, wherein the first prompt further comprises past elements of a conversation in the chatbot user interface.

In Example 6, the subject matter of Examples 1-5 includes, wherein the intermediate query representation comprises filter predicates, aggregation predicates, and filter structure.

In Example 7, the subject matter of Example 6 includes, wherein the converting comprises storing the filter structure as an abstract syntax tree, translating each atomic condition in the abstract syntax tree to an atomic condition in the language, and converting the abstract tree structure into a Boolean expression.

Example 8 is a method comprising: receiving a natural language request via a chatbot user interface; matching the natural language request to a first scenario of a plurality of scenarios managed by a chatbot runtime, the first scenario defining three functions for accessing data in an Enterprise Resource Planning (ERP) system; executing a first function of the three functions, causing a query runtime to: generate a first prompt using the natural language request and the first scenario; send the first prompt to a Large Language Model (LLM); receive an intermediate query representation; and convert the intermediate query representation into a query, in a language corresponding to the ERP system; executing a second function of the three functions, causing the query runtime to run the query on the ERP system to retrieve ERP data; and executing a third function of the three functions, causing the query runtime to render the ERP data in the chatbot user interface.

In Example 9, the subject matter of Example 8 includes, wherein the first scenario additionally defines a first user interface configuration, and wherein the executing of the third function further comprises altering display parameters of the chatbot user interface based on the first user interface configuration.

In Example 10, the subject matter of Examples 8-9 includes, wherein the first prompt further comprises one or more hints provided by a designer of the first scenario, the one or more hints comprising at least one definition, not available in a data model of the first scenario, of one or more terms.

In Example 11, the subject matter of Examples 8-10 includes, wherein the first prompt further comprises an application context.

In Example 12, the subject matter of Examples 8-11 includes, wherein the first prompt further comprises past elements of a conversation in the chatbot user interface.

In Example 13, the subject matter of Examples 8-12 includes, wherein the intermediate query representation comprises filter predicates, aggregation predicates, and filter structure.

In Example 14, the subject matter of Example 13 includes, wherein the converting comprises storing the filter structure as an abstract syntax tree, translating each atomic condition in the abstract syntax tree to an atomic condition in the language, and converting the abstract tree structure into a Boolean expression.

Example 15 is a non-transitory machine-readable medium storing instructions which, when executed by one or more processors, cause the one or more processors to perform operations comprising: receiving a natural language request via a chatbot user interface; matching the natural language request to a first scenario of a plurality of scenarios managed by a chatbot runtime, the first scenario defining three functions for accessing data in an Enterprise Resource Planning (ERP) system; and executing a first function of the three functions, causing a query runtime to: generate a first prompt using the natural language request and the first scenario; send the first prompt to a Large Language Model (LLM); receive an intermediate query representation; and convert the intermediate query representation into a query, in a language corresponding to the ERP system; executing a second function of the three functions, causing the query runtime to run the query on the ERP system to retrieve ERP data; and executing a third function of the three functions, causing the query runtime to render the ERP data in the chatbot user interface.

In Example 16, the subject matter of Example 15 includes, wherein the first scenario additionally defines a first user interface configuration, and wherein the executing of the third function further comprises altering display parameters of the chatbot user interface based on the first user interface configuration.

In Example 17, the subject matter of Examples 15-16 includes, wherein the first prompt further comprises one or more hints provided by a designer of the first scenario, the one or more hints comprising at least one definition, not available in a data model of the first scenario, of one or more terms.

In Example 18, the subject matter of Examples 15-17 includes, wherein the first prompt further comprises an application context.

In Example 19, the subject matter of Examples 15-18 includes, wherein the first prompt further comprises past elements of a conversation in the chatbot user interface.

In Example 20, the subject matter of Examples 15-19 includes, wherein the intermediate query representation comprises filter predicates, aggregation predicates, and filter structure.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 8:
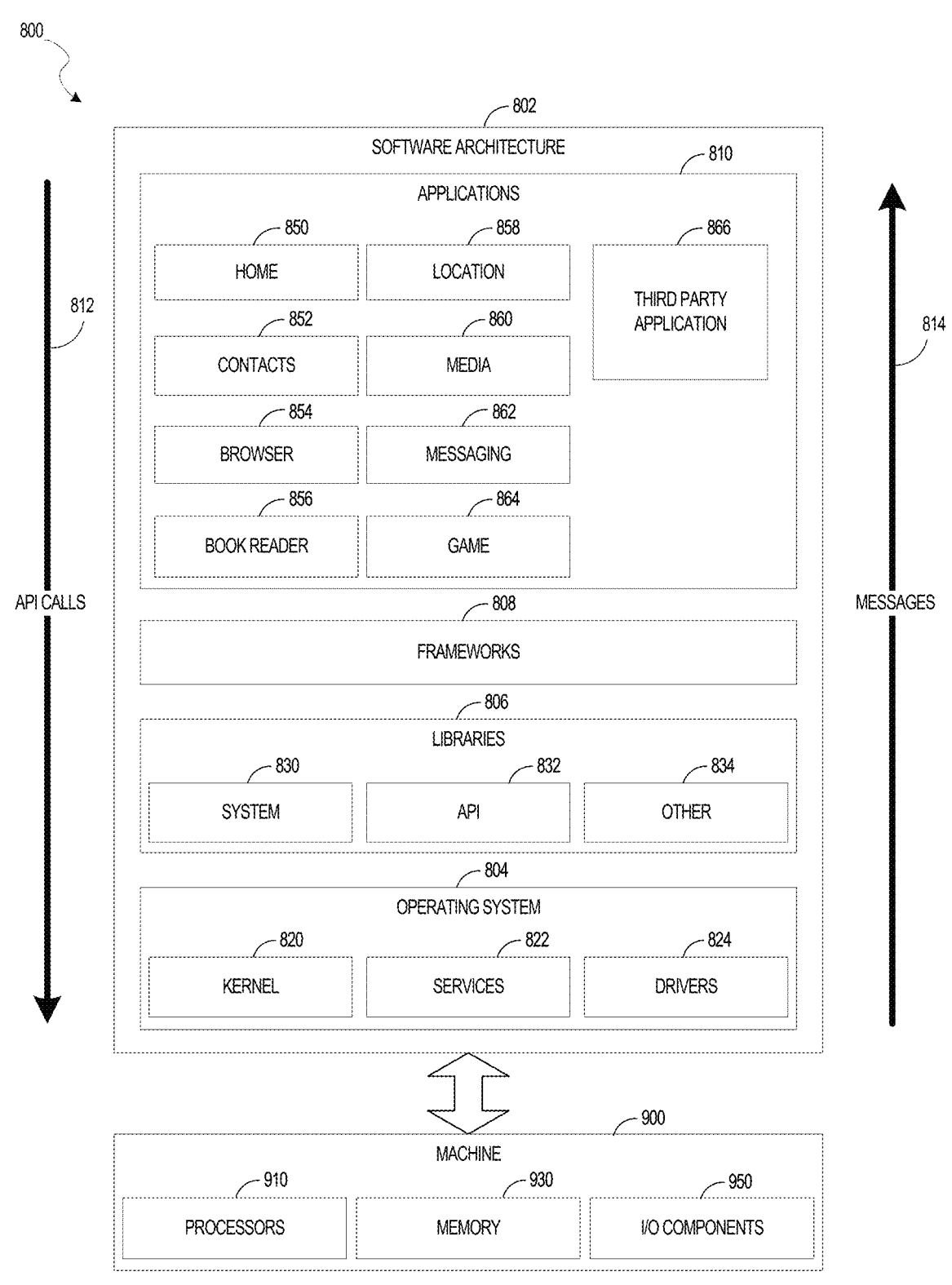
FIG. 8 is a block diagram illustrating a software architecture, in accordance with an example embodiment.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that comprises processors 910, memory 930, and input/output (I/O) components 950. In this example architecture, the software architecture 802 can be conceptualized as a stack of layers where each layer may provide a particular functionality. For example, the software architecture 802 comprises layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 comprises, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionalities. The services 822 can provide other common services for the other software layers. The drivers 824 are responsible for controlling or interfacing with the underlying hardware, according to some embodiments. For instance, the drivers 824 can comprise display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can comprise system libraries 830 (e.g., C standard library) that can provide functions such as memory allocation functions, string manipulation functions, mathematic functions, and the like. In addition, the libraries 806 can comprise API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also comprise a wide variety of other libraries 834 to provide many other APIs to the applications 810.

The frameworks 808 provide a high-level common infrastructure that can be utilized by the applications 810, according to some embodiments. For example, the frameworks 808 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 comprise a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
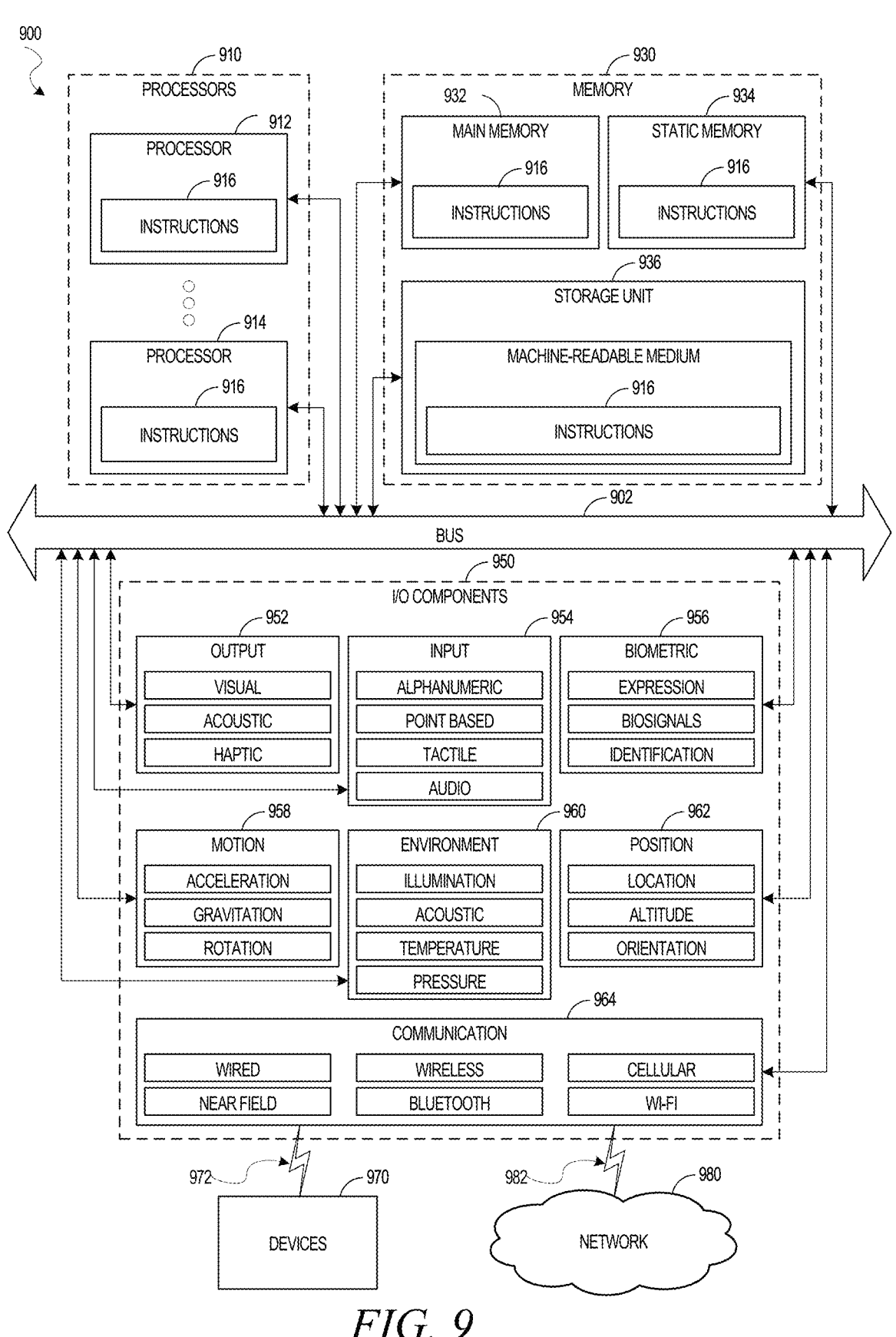
FIG. 9 illustrates a diagrammatic representation of a machine in the form of a computer system within which a set of instructions may be executed for causing the machine to perform any one or more of the methodologies discussed herein.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 700 of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to comprise a collection of machines 900 that individually or jointly execute the instructions 916 to perform any one or more of the methodologies discussed herein.

The machine 900 may comprise processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may comprise, for example, a processor 912 and a processor 914 that may execute the instructions 916. The term "processor" is intended to comprise multi-core processors that may comprise two or more independent processors (sometimes referred to as "cores") that may execute instructions 916 contemporaneously. Although FIG. 9 shows multiple processors 910, the machine 900 may comprise a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may comprise a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may comprise a wide variety of components to receive input, provide output, produce output, transmit information, exchange information, capture measurements, and so on. The specific I/O components 950 that are comprised in a particular machine will depend on the type of machine. For example, portable machines such as mobile phones will likely comprise a touch input device or other such input mechanisms, while a headless server machine will likely not comprise such a touch input device. It will be appreciated that the I/O components 950 may comprise many other components that are not shown in FIG. 9. The I/O components 950 are grouped according to functionality merely for simplifying the following discussion, and the grouping is in no way limiting. In various example embodiments, the I/O components 950 may comprise output components 952 and input components 954. The output components 952 may comprise visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may comprise alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may comprise biometric components 956, motion components 958, environmental components 960, or position components 962, among a wide array of other components. For example, the biometric components 956 may comprise components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may comprise acceleration sensor components (e.g., accelerometer), gravitation sensor components, rotation sensor components (e.g., gyroscope), and so forth. The environmental components 960 may comprise, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may comprise location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may comprise communication components 964 operable to couple the machine 900 to a network 980 or devices 970 via a coupling 982 and a coupling 972, respectively. For example, the communication components 964 may comprise a network interface component or another suitable device to interface with the network 980. In further examples, the communication components 964 may comprise wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or comprise components operable to detect identifiers. For example, the communication components 964 may comprise radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (e.g., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to comprise, but not be limited to, solid-state memories, and optical and magnetic media, comprising memory internal or external to processors. Specific examples of machine-storage media, computer-storage media, and/or device-storage media comprise non-volatile memory, comprising by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may comprise a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) comprising 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component comprised in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to comprise any intangible medium that is capable of storing, encoding, or carrying the instructions 916 for execution by the machine 900, and comprise digital or analog communications signals or other intangible media to facilitate communication of such software. Hence, the terms "transmission medium" and "signal medium" shall be taken to comprise any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to comprise both machine-storage media and transmission media. Thus, the terms comprise both storage devices/media and carrier waves/modulated data signals.

What is claimed is:

1. A system comprising:

at least one hardware processor;

a non-transitory computer-readable medium storing instructions that, when executed by the at least one hardware processor, cause the at least one hardware processor to perform operations comprising:

receiving a natural language request via a chatbot user interface;

matching the natural language request to a first scenario of a plurality of scenarios managed by a chatbot runtime, the first scenario generated based on a query configuration and defining three functions for accessing data in an Enterprise Resource Planning (ERP) system, the query configuration specifying a target query language for the ERP system; and executing a first function of the three functions, causing a query runtime to:

generate a first prompt using the natural language request and the first scenario, the first prompt comprising a description of an intermediate query representation tailored to a scope of the target query language specified by the first scenario;

send the first prompt to a Large Language Model (LLM);

receive the intermediate query representation in a language not run by the ERP system; and deterministically convert the intermediate query representation into a query, in the target query language corresponding to the ERP system;

executing a second function of the three functions, causing the query runtime to run the query on the ERP system to retrieve ERP data; and executing a third function of the three functions, causing the query runtime to render the ERP data in the chatbot user interface.

2. The system of claim 1, wherein the first scenario additionally defines a first user interface configuration, and wherein the executing of the third function further comprises altering display parameters of the chatbot user interface based on the first user interface configuration.

3. The system of claim 1, wherein the first prompt further comprises one or more hints provided by a designer of the first scenario, the one or more hints comprising at least one definition, not available in a data model of the first scenario, of one or more terms.

4. The system of claim 1, wherein the first prompt further comprises an application context.

5. The system of claim 1, wherein the first prompt further comprises past elements of a conversation in the chatbot user interface.

6. The system of claim 1, wherein the intermediate query representation comprises filter predicates, aggregation predicates, and filter structure, the filter structure defining whether filter presentation is a complex nested structure.

7. The system of claim 6, wherein the converting comprises storing the filter structure as an abstract syntax tree, translating each atomic condition in the abstract syntax tree to an atomic condition in the language, and converting the abstract syntax tree into a Boolean expression.

8. A method comprising:

receiving a natural language request via a chatbot user interface;

matching the natural language request to a first scenario of a plurality of scenarios managed by a chatbot runtime, the first scenario generated based on a query configuration and defining three functions for accessing data in an Enterprise Resource Planning (ERP) system, the query configuration specifying a target query language for the ERP system; and executing a first function of the three functions, causing a query runtime to:

generate a first prompt using the natural language request and the first scenario, the first prompt comprising a description of an intermediate query representation tailored to a scope of the target query language specified by the first scenario;

send the first prompt to a Large Language Model (LLM);

receive the intermediate query representation in a language not run by the ERP system; and deterministically convert the intermediate query representation into a query, in the target query language corresponding to the ERP system;

executing a second function of the three functions, causing the query runtime to run the query on the ERP system to retrieve ERP data; and executing a third function of the three functions, causing the query runtime to render the ERP data in the chatbot user interface.

9. The method of claim 8, wherein the first scenario additionally defines a first user interface configuration, and wherein the executing of the third function further comprises altering display parameters of the chatbot user interface based on the first user interface configuration.

10. The method of claim 8, wherein the first prompt further comprises one or more hints provided by a designer of the first scenario, the one or more hints comprising at least one definition, not available in a data model of the first scenario, of one or more terms.

11. The method of claim 8, wherein the first prompt further comprises an application context.

12. The method of claim 8, wherein the first prompt further comprises past elements of a conversation in the chatbot user interface.

13. The method of claim 8, wherein the intermediate query representation comprises filter predicates, aggregation predicates, and filter structure, the filter structure defining whether filter presentation is a complex nested structure.

14. The method of claim 13, wherein the converting comprises storing the filter structure as an abstract syntax tree, translating each atomic condition in the abstract syntax tree to an atomic condition in the language, and converting the abstract syntax tree into a Boolean expression.

15. A non-transitory machine-readable medium storing instructions which, when executed by one or more processors, cause the one or more processors to perform operations comprising:

receiving a natural language request via a chatbot user interface;

matching the natural language request to a first scenario of a plurality of scenarios managed by a chatbot runtime, the first scenario generated based on a query configuration and defining three functions for accessing data in an Enterprise Resource Planning (ERP) system, the query configuration specifying a target query language for the ERP system; and executing a first function of the three functions, causing a query runtime to:

generate a first prompt using the natural language request and the first scenario, the first prompt comprising a description of an intermediate query representation tailored to a scope of the target query language specified by the first scenario;

send the first prompt to a Large Language Model (LLM);

receive the intermediate query representation in a language not run by the ERP system; and deterministically convert the intermediate query representation into a query, in the target query language corresponding to the ERP system;

executing a second function of the three functions, causing the query runtime to run the query on the ERP system to retrieve ERP data; and executing a third function of the three functions, causing the query runtime to render the ERP data in the chatbot user interface.

16. The non-transitory machine-readable medium of claim 15, wherein the first scenario additionally defines a first user interface configuration, and wherein the executing of the third function further comprises altering display parameters of the chatbot user interface based on the first user interface configuration.

17. The non-transitory machine-readable medium of claim 15, wherein the first prompt further comprises one or more hints provided by a designer of the first scenario, the one or more hints comprising at least one definition, not available in a data model of the first scenario, of one or more terms.

18. The non-transitory machine-readable medium of claim 15, wherein the first prompt further comprises an application context.

19. The non-transitory machine-readable medium of claim 15, wherein the first prompt further comprises past elements of a conversation in the chatbot user interface.

20. The non-transitory machine-readable medium of claim 15, wherein the intermediate query representation comprises filter predicates, aggregation predicates, and filter structure, the filter structure defining whether filter presentation is a complex nested structure.

* * * * *